Nov. 14, 1939.  H. L. SAYLOR  2,180,301
CENTRIFUGAL MACHINE FOR HOMOGENIZING
Filed Sept. 24, 1937
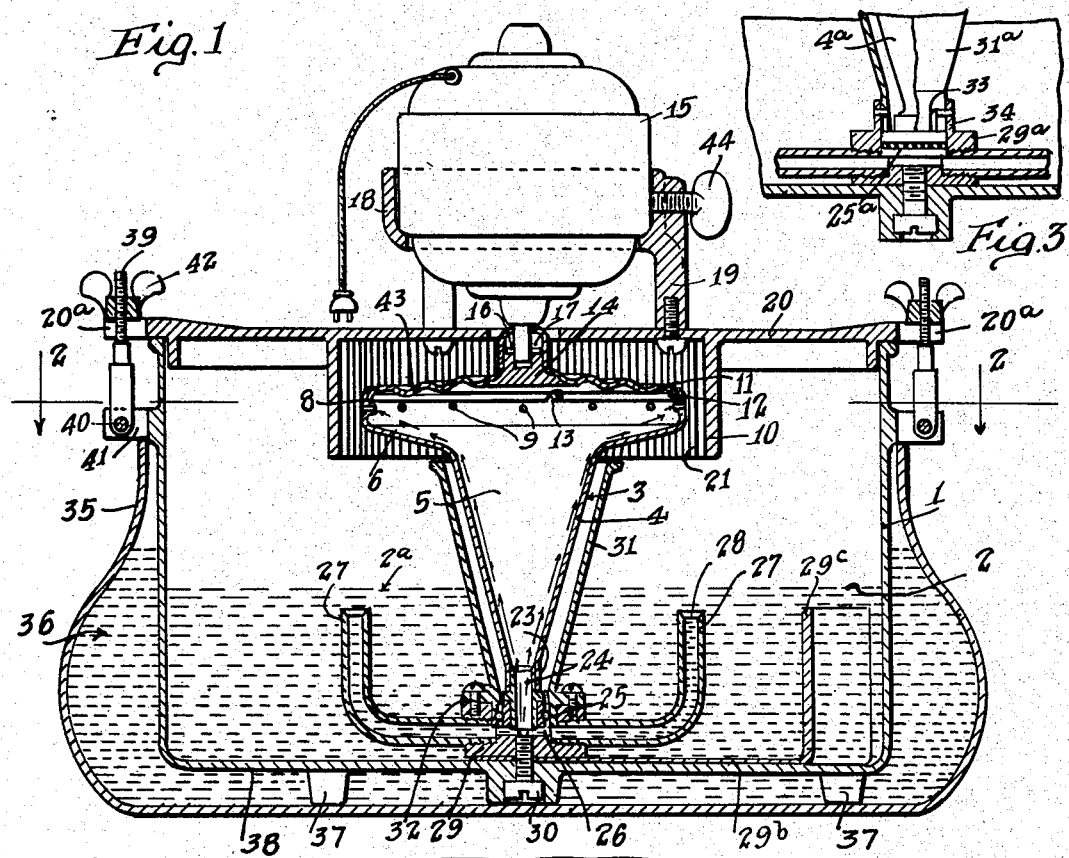
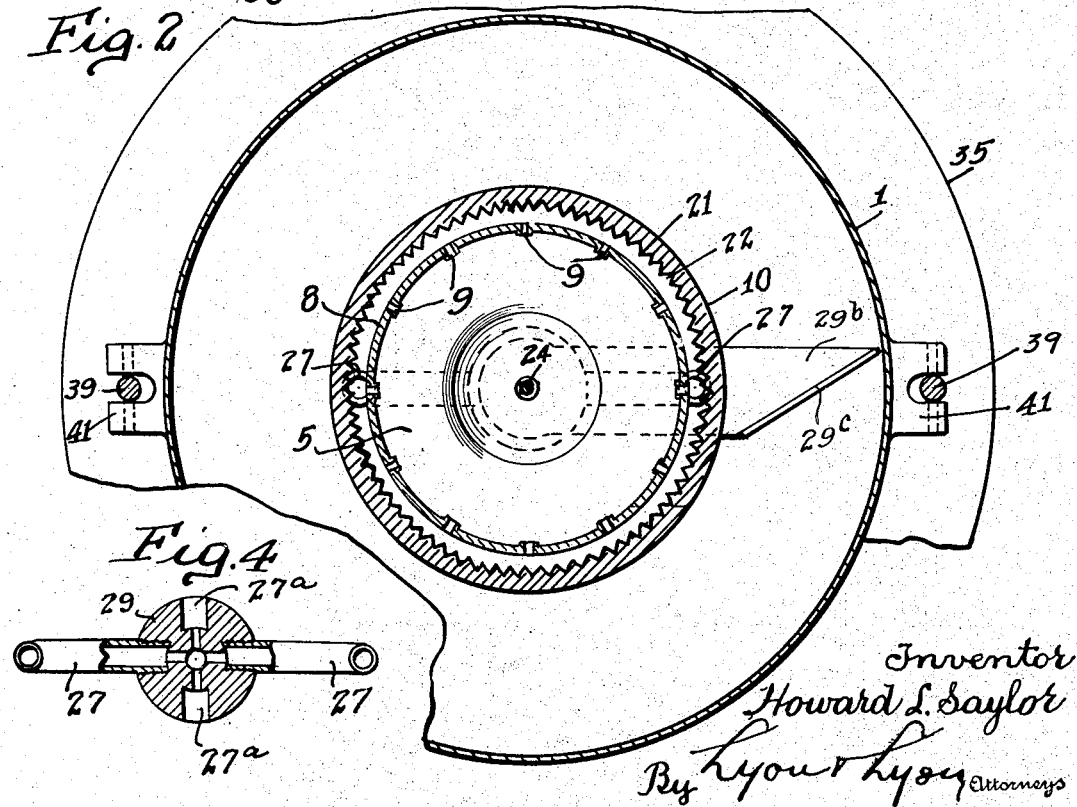
Inventor
Howard L. Saylor
By Lyon & Lyon Attorneys Patented Nov. 14, 1939

2,180,301

UNITED STATES PATENT OFFICE 2,180,301

CENTRIFUGAL MACHINE FOR HOMOGENIZING

Howard L. Saylor, Los Angeles, Calif., assignor to Homogenizer Corporation, Ltd., Los Angeles, Calif., a corporation of California Application September 24, 1937, Serial No. 165,497

3 Claims. (Cl. 99—266)

This invention relates to a centrifugal machine for producing a mixture of liquid elements in a a homogeneous state.

The invention is intended to be used in making cream from mixtures of butter and milk. It is well known that cream can be formed from mixtures of butter and milk with considerable economy of cost as compared with the cost of natural cream. Machines for producing cream from mixtures of butter and milk are now in common use, but these machines are relatively very expensive, and are not at all suitable for producing cream in this way in small quantities. In the operation of centrifugal machines for this purpose, a mixture of milk and liquid butter is fed into the machine, and through the agency of centrifugal force the molecules of the butter, and particularly the butter fat, are broken down and combined with the molecules of the milk to form cream.

The general object of this invention is to produce a machine of simple construction, which can be used to operate upon a mixture of butter and milk, or other ingredients that are to be intimately mixed together, so as to utilize the centrifugal force most advantageously to produce jets of the mixture moving at high velocity and to act upon the jets in such a way as to break down the molecules and form a homogenized mixture.

One of the objects of the invention is to provide a construction for the device, which will operate in such a way that the rotor will automatically raise the mixture of liquids when the rotor is rotating at a high speed, and develop pressure within the rotor and thereby attain a homogenizing effect; also to provide simple means cooperating with the rotor to augment the action of the rotor in reducing the mixture to a homogeneous state.

A further object of the invention is to provide a construction whereby this can be readily accomplished without producing any rotary motion of the mixture of liquids in the containing vessel, or holder.

A further object of the invention is to provide improved means for cooperating with the rotor for breaking up the molecules of the liquid butter, to facilitate their combination with the molecules of the milk to produce a homogeneous mixture.

A further object of the invention is to construct the device so that the rotor will be automatically supplied with the liquid taken from a point near the level of the mixture which, at the starting of the machine, will be relatively rich in butter fat.

A further object of the invention is to construct the rotor in such a way as to facilitate access to its interior for cleaning the same.

Further objects of the invention will appear hereinafter.

The invention consists in the novel parts and combination of parts to be described hereinafter, all of which contribute to produce an efficient centrifugal machine for homogenizing.

A preferred embodiment of the invention is described in the following specification, while the broad scope of the invention is pointed out in the appended claims.

In the drawing:

Fig. 1 is vertical section through apparatus embodying my invention.

Fig. 2 is a horizontal section taken about on the line 2—2 of Fig. 1, and further illustrating details of the device.

Fig. 3 is a vertical section taken at the lower end of the rotor, and illustrating a modification of the construction at this point, as compared with the construction illustrated in Fig. 1.

Fig. 4 is a fragmentary view and is a horizontal section at the base supporting the rotor as illustrated in Fig. 1, certain parts being shown partially in plan.

Before proceeding to a more detailed description of the invention, it should be stated that in practicing the invention I provide means for causing the mixed liquids to issue at a high velocity from a plurality of outlets or nozzles in the form of jets, and I provide a plurality of teeth located adjacent these outlets. In the operation of the machine a relative rotation is developed during which the teeth cut across the jets at a high velocity. This has a very high homogenizing effect on the mixing liquids. Various constructions may be employed for attaining this effect, but in the following specification the invention is described as applied to a rotor that is driven at a high speed and which is provided with a plurality of outlets through which the jets issue, and as the rotor rotates, the vanes or teeth adjacent to them by reason of the relative rotation, cut across the issuing jets at a high velocity.

Referring more particularly to the parts, the apparatus preferably includes a vessel, or holder 1, for holding the mixture 2 that is to be reduced to a homogeneous state. This vessel 1 is preferably of substantially circular or cylindrical form, and preferably on its central vertical axis I provide a rotor 3. This rotor 3 is preferably of conical form, that is to say, the body 4 of the rotor is preferably of conical form with its larger end uppermost, and formed of thin sheet metal so that a conical upwardly expanding chamber 5 is formed in the body 4. Means is provided for admitting the mixture 2 into the lower end of this hollow cone 4, and the rotor is so constructed that when it is rotated at a high speed, the liquid within the cone, due to the centrifugal force, will climb up the inner face of the conical wall of the body 4, and eventually arrive at the head or upper end of the rotor. This head is constructed in such a way that the mixture within it will rotate at a very high velocity, thereby developing relatively great centrifugal force in it, and causing the mixture to be projected outwardly in one or more streams from the head. For this purpose I prefer to form the centrifugal rotor with a head 6 of enlarged diameter. This head is of conical form and its lower portion where it forms a junction with the upper end of the body 4, preferably forms an angle with a curved face, or fillet, so that the wall of the cone 4 gradually assumes the wider angle of the "cone" of the head 6. The head 6 also preferably includes a substantially vertical cylindrical flange 8, said flange being provided with a plurality of outlet means in the form of orifices 9 through which the liquid mixture passes at a high velocity due to centrifugal force. These streams projected from the orifices 9, strike violently against a baffle wall 10, which cooperates with the rotor to break down the molecules of the butter so that the same can mix freely with the molecules of the milk to form cream. The head 6 preferably includes a cap 11 in the form of a slightly dished plate, and this cap is preferably constructed so that it is removable from the body of the rotor to give access to the chamber 5 for cleaning the same. For this purpose the cap 11 is preferably formed with a downwardly projecting flange 12 that overlaps the flange 8, and which is secured to the same by detachable means preferably consisting of a plurality of bayonet slot connections 13 (see Fig. 1). The central portion of the cap 11 is provided with a socket fitting 14 of any suitable construction to enable the rotor to be rotated by a flexible shaft, but preferably by means of a small electric motor 15, the shaft of which is provided with a transverse driving pin 16 engaging in slots 17 in the socket fitting 14. The motor 15 may be removably mounted in a holder 18 of ring-form provided with a plurality of legs in the form of posts 19 that are secured to the cover 20 of the vessel 1. The baffle wall 10 is preferably formed integrally with the cover 20, and the inner face of this wall against which the centrifugal streams are projected, is preferably of a roughened character to increase the effect of the centrifugal force in breaking down the butter fat molecules. For this purpose I prefer to form the inner face of the baffle 10 with inwardly extending projections preferably in the form of ridges or teeth 21, the axes of which extend in a vertical direction. These teeth, due to the relative rotation of the rotor, cut across the jets at a high velocity. In the present instance they have inclined faces that meet together to form a series of angular or V-shaped recesses 22 into which the streams of the mixture are projected violently by the centrifugal force as the teeth cut across the jets.

The lower end of the conical body 4 of the rotor is preferably formed with a short tubular neck 23 to facilitate attaching the same to a tubular inlet 24, which is in the form of a short sleeve mounted for rotation in a suitable bearing, preferably a ball bearing 25, as indicated. Such a bearing, or other suitable anti-friction bearing, greatly reduces the resistance and enables a motor to develop a very high speed in the rotor. The tubular inlet 24 is supplied with liquid from the mixture through a plurality of inlets 26, said inlets preferably consisting of a plurality of tubes 27 with upwardly turned ends so that the mouths 28 of these inlets are located slightly below the lever 2a of the liquid 2. In constructing the machine, the horizontal extensions of these small bent tubes can be threaded into sockets in the central block 29, said block being secured in position by a screw 30 that extends up through the bottom, but any other suitable means may be employed for securing this block in position.

In order to prevent the rotation of the rotor from imparting any rotation to the mixture in the vessel, which would be undesirable, and which would interfere with the proper feeding of the liquid through the mouths 28 of the inlets, I prefer to provide a screen or guard 31 that envelops the conical body 4 of the rotor. This screen is preferably in the form of a conical shell that may be attached by any suitable means, such as the screws 32, to the upper face of the block.

With the construction described, it will be evident that by removing the cover 20 access can be had to the rotor. The tubular neck 23 of the rotor is, of course, friction-tight on the inlet sleeve or thimble 24, and the rotor can therefore be removed simply by pulling the same upwardly. After removing the rotor, its cap 11 can be disengaged so as to give access to the interior of the rotor for cleaning.

If desired, I may employ construction enabling the guard envelope 31 to be more readily removable than when attached as illustrated in Fig. 1. Such a construction as this is illustrated in Fig. 3, in which 31a indicates the conical shell or envelope to protect the conical body 4a of the rotor from coming in contact with the liquid mixture. The lower end of the conical guard 31a may be provided with two bayonet slot connections 33 for securing the same to a flange 34 projecting up from the block 29a that corresponds to the block 29. This block carries an anti-friction central bearing 25a for the conical body 4a of the centrifugal rotor.

A considerable part of the homogenizing effect is accomplished by reason of the fact that the orifices 9 in the rotor head are relatively small— in fact it is preferable to have their total area less than the area of the inlet 24, the result being that the rotor develops considerable pressure in the liquid within the head, thereby forcing the liquid through these small orifices which has a homogenizing effect. This effect is enhanced by the liquid streams striking violently against the baffle wall 10.

This device will produce a homogeneous mixture, and hence I prefer to call it a "homogenizer." It is found in practice that the homogenizing effect when operating upon a mixture of butter and milk, is greatly facilitated if the elements of the mixture are slightly warm. For this purpose the vessel 1 is preferably set within an outer vessel 35, which provides a space 36 to receive water. This vessel with the holder 1 within it, can be placed on a stove if desired. The inner vessel, or holder 1, is preferably provided with short posts, or feet 37, that hold the bottom 38 of the holder 1 somewhat elevated so as to provide circulation space for the water 36 under it.

The cover 20 may be removably secured in place, for which purpose I prefer to provide it with a pair of oppositely disposed slots 20a to cooperate with pivoted clamping screws 39, the lower ends of said screws 39 being secured on pivot pins 40 between the forks of bifurcated lugs 41 projecting out from the side wall of the holder 1. These lugs also may rest on the upper edge of the outer vessel 35.

Wing nuts 42 are provided for clamping up on the cover to hold it securely in position.

If it is desired to stiffen the cap plate 11 of the rotor to prevent any distortion occurring due to the relatively high centrifugal force, this is preferably accomplished by forming this part with corrugations 43. The corrugations may extend radially, or they may be circumferential as shown. The driving connection between the motor shaft and the socket fitting 14 is preferably a loose connection, and what is popularly called a "sloppy" fit. This insures that the motor will rotate the rotor efficiently without necessitating very accurate alignment between the axis of the rotor and the axis of the motor shaft. The motor may be removably secured in place by a set screw 44.

The angular form of the pockets between the ridges of the baffle wall is very efficient in producing the "homogenizing" effect, probably because the cross-section of the stream is contracted, causing a crowding or forcing of the liquid into the angles at the bottoms of the pockets. This gives the effect of a violent slap to the molecules of the mixture.

I provide means for opposing any tendency to develop a swirling movement in the mixture 2. For this purpose I prefer to employ a baffle or vane 29c projecting upwardly from a plate 29b that lies at the bottom 38. This plate 29b if desired, may be formed with an opening at its inner end to receive the screw 30, enabling the plate to be clamped rigidly between the bottom face of the central block 29 and the bottom 38. This vane 29a is inclined in plan (see Fig. 3) so that it gives a mixing effect in whatever swirl effect that takes place, by deflecting the outer portions of the mixture inwardly toward the center.

As indicated, there are preferably two of the tubes 27, which may be located diametrically opposite to each other, with intermediate inlet openings 27a for admitting the mixture directly into the intake 24.

What I claim is:

1. In a centrifugal machine for reducing a mixture of liquid elements to a homogeneous state, the combination of a vessel having a chamber for holding said liquid elements, a centrifugal rotor mounted to rotate within the vessel on a substantially vertical axis, means for admitting the liquid from the chamber to the interior of said rotor, said rotor having outlet means above the level of the liquid in said chamber, means for rotating the rotor at a high velocity, and thereby causing the liquid to rise within the same and be projected violently outwardly by centrifugal force through the outlet means, and a baffle surrounding the rotor and against which the liquid is projected through said outlet means, said baffle having teeth extending in a general vertical direction and projecting toward the rotor, and against which the liquid impinges.

2. In a centrifugal machine for reducing a mixture of liquid elements to a homogeneous state, the combination of means for forcing the liquid through a plurality of outlets in the form of jets moving at a high velocity, a member having a plurality of teeth located adjacent to the said outlets, said means operating to cause a relative rotation between the outlets and the said member to cause said teeth to cut across the jets at a high velocity.

3. In a centrifugal machine for reducing a mixture of liquid elements to a homogeneous state, the combination of a vessel, a centrifugal rotor mounted to rotate within the vessel on a substantially vertical axis, means for admitting the liquid mixture to the interior of said rotor, said rotor having outlets, means for rotating the rotor at a high velocity, and thereby causing the liquid to be projected violently outwardly by centrifugal force in jets through the outlets, and a baffle surrounding the rotor and having teeth adjacent the outlets against which the liquid is projected through said outlets, said teeth operating to cut across the said jets as the rotor rotates.

HOWARD L. SAYLOR.